United States Patent
Moehlenkamp et al.

(10) Patent No.: US 8,212,534 B2
(45) Date of Patent: Jul. 3, 2012

(54) METHOD FOR STARTING UP A SYSTEM FOR GENERATING ELECTRICAL POWER

(75) Inventors: Georg Moehlenkamp, Großbeeren (DE); Aurélie Bocquel, Berlin (DE)

(73) Assignee: Converteam Technology, Ltd., Warwickshire (GB)

( * ) Notice: Subject to any disclaimer, the term of this patent is extended or adjusted under 35 U.S.C. 154(b) by 585 days.

(21) Appl. No.: 12/155,893

(22) Filed: Jun. 11, 2008

(65) Prior Publication Data

US 2009/0278350 A1 Nov. 12, 2009

(30) Foreign Application Priority Data

May 10, 2008 (DE) .................. 10 2008 023 210

(51) Int. Cl.
*H20P 9/00* (2006.01)
(52) U.S. Cl. ............................. 322/91; 322/90
(58) Field of Classification Search .......... 322/90, 322/91
See application file for complete search history.

(56) References Cited

U.S. PATENT DOCUMENTS

| | | | |
|---|---|---|---|
| 5,315,229 A | | 5/1994 | Markus |
| 5,594,322 A * | | 1/1997 | Rozman et al. .................. 322/10 |
| 5,694,026 A | | 12/1997 | Blanchet |
| 5,929,612 A * | | 7/1999 | Eisenhaure et al. ............. 322/47 |
| 6,118,186 A * | | 9/2000 | Scott et al. .................. 290/40 B |
| 6,198,250 B1 | | 3/2001 | Gartstein et al. |
| 6,876,176 B2 | | 4/2005 | Stefanovic et al. |
| 7,180,270 B2 * | | 2/2007 | Rufer et al. ...................... 322/20 |
| 7,348,764 B2 * | | 3/2008 | Stewart et al. .................. 322/24 |
| 2002/0093200 A1 | | 7/2002 | Stefanovic et al. |
| 2005/0237774 A1 | | 10/2005 | Lacaze et al. |

FOREIGN PATENT DOCUMENTS

| | | |
|---|---|---|
| DE | 33 41 984 A1 | 5/1985 |
| DE | 297 01 914 | 5/1997 |
| DE | 101 57 257 A1 | 7/2002 |
| DE | 102 52 234 A1 | 6/2004 |
| WO | WO 2006/103155 A1 | 10/2006 |

OTHER PUBLICATIONS

German Office Action for corresponding German Application No. 10 2008 023 210.6-32 dated Dec. 15, 2008.
Official Report dated Oct. 6, 2010, for corresponding European Patent Application No. 09004632.7.
English language translation of German Office Action dated Dec. 11, 2008.
German Office Action dated Dec. 11, 2008.

\* cited by examiner

*Primary Examiner* — Tulsidas C Patel
*Assistant Examiner* — Iraj A Mohandesi
(74) *Attorney, Agent, or Firm* — Harness, Dickey & Pierce, P.L.C.

(57) ABSTRACT

Described is a method for starting up a system for generating electrical power. The system includes a turbine that is mechanically connected to a generator, while the generator is electrically connected via a converter to a load, in particular to a power supply grid. The generator includes a total number of windings. With at least one embodiment of the method, a number of generator windings are combined at low rotational speeds of the turbine, wherein the combined number of windings is less than the total number of windings.

20 Claims, 3 Drawing Sheets

METHOD FOR STARTING UP A SYSTEM FOR GENERATING ELECTRICAL POWER

PRIORITY STATEMENT

This application claims benefit under 35 U.S.C. §119 to German Patent Application No. 10 2008 023 210.6, filed on May 10, 2008 in the German Patent Office, the disclosure of which is incorporated herein in its entirety by reference.

FIELD

At least one embodiment of the invention generally relates to a method for starting up a system for generating electrical power and/or to a respective system for generating electrical power.

BACKGROUND

A system is known, for example, from U.S. Pat. No. 5,694,026, which discloses a turbine that is mechanically directly connected to a generator, which in turn is connected via a converter and a transformer to a power supply grid. No mechanical gear is disposed between the turbine and the generator. In the generator operation, the turbine is supplied with fuel, so that the generator is driven by the turbine and thus generates electrical power. This electrical power is fed via the converter and the transformer into the power supply grid.

To start the turbine from the standstill, the generator is operated as a motor, wherein electrical power is supplied from the grid via the transformer and the converter to the generator in order to start the generator rotation. The turbine is accelerated in this way to a desired rotational speed.

SUMMARY

It is the object of the present invention to improve the known system for generating electrical power.

In at least one embodiment, a method is disclosed for starting a system for generating electrical power; and in at least one other embodiment, a corresponding system is disclosed for generating electrical power.

The system according to at least one embodiment of the invention furthermore includes a turbine that is mechanically connected to a generator, wherein the generator is electrically connected via a converter to a load, in particular to an electrical power supply grid. The generator is furthermore provided with a total number of windings. With the method according to at least one embodiment of the invention, the generator windings are combined at low rotational speeds of the turbine, wherein the number of combined windings is lower than the total number of windings.

During the start-up and thus at low rotational speeds of the turbine and the generator, the induced voltage at the generator windings, as well as the frequency of this voltage is very low. By combining the generator windings according to at least one embodiment of the invention, it is possible to generate a higher voltage. With the aid of this higher voltage, the generator functioning as a motor operation and thus also the turbine can be made to rotate. As a result, the same components that already exist for operating the generator in the generator mode can also be used for the start-up of the turbine where the generator functions as a motor, thereby avoiding additional expenditures and costs.

The generator according to one advantageous embodiment of the invention is embodied as a synchronous generator, in particular as a synchronous generator having polygonal-shaped windings, which makes it particularly easy to combine the windings according to the invention.

The converter according to a different advantageous embodiment of the invention comprises a plurality of switching devices, in particular thyristors, which allow realizing the combining of the generator windings by blocking the respective switching devices. This embodiment also represents a particularly simple mode of operation for realizing the inventive combining of generator windings.

It is furthermore particularly advantageous if the converter is commutated at low rotational speeds of the turbine in dependence on the load, especially in dependence on the energy supply grid, and at higher rotational speeds in dependence on the generator. This ensures a secure mode of operation for the converter over the complete rotational speed range of the turbine and thus also over the complete rotational speed range of the generator.

BRIEF DESCRIPTION OF THE DRAWINGS

Additional features, optional applications and advantages of the invention are described in the following description of example embodiments of the invention, which are represented in the Figures of the drawing. All described or illustrated features by themselves or in any combination thereof form the subject matter of this invention, independent of how they are summarized in the patent claims or the references back of the claims, as well as independent of their formulation and/or representation in the specification and/or the drawing.

DETAILED DESCRIPTION OF THE EXAMPLE EMBODIMENTS

Figure 1:
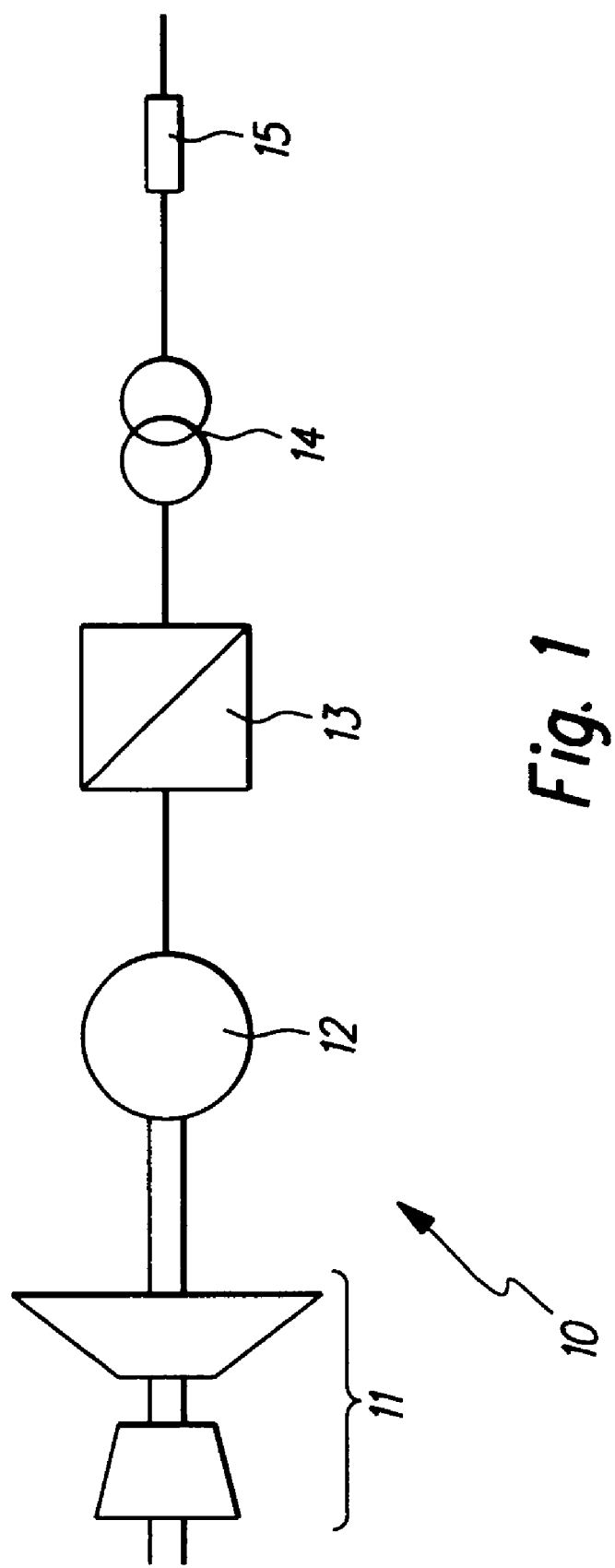
FIG. 1 shows a block diagram of an example embodiment of a system according to the invention for generating electrical power.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The system 10 shown in FIG. 1 for generating electrical power includes a turbine 11, which is directly connected mechanically to a generator 12, with no gear or the like connected in-between. The generator 12 is connected to a converter 13 which in turn is connected to a transformer 14. The transformer 14 is furthermore connected to an electric load 15, for example an electric power supply grid.

During the operation, the rotation of the turbine 11 can be started with the aid of fuels. As a result of this direct mechanical connection, the rotation of the generator 12 is also started thus generates an output voltage with a speed-dependent frequency while operating as generator. With the aid of the converter 13, this changing frequency of the output voltage is converted to an essentially fixed frequency, for example corresponding to the frequency of the energy supply grid. Following this, the output voltage is raised with the aid of the transformer 14 to a predetermined voltage, for example the voltage of the energy supply grid. Power is thus generated with the above-described system 10 and is fed, for example, into the energy supply grid.

Figure 2:
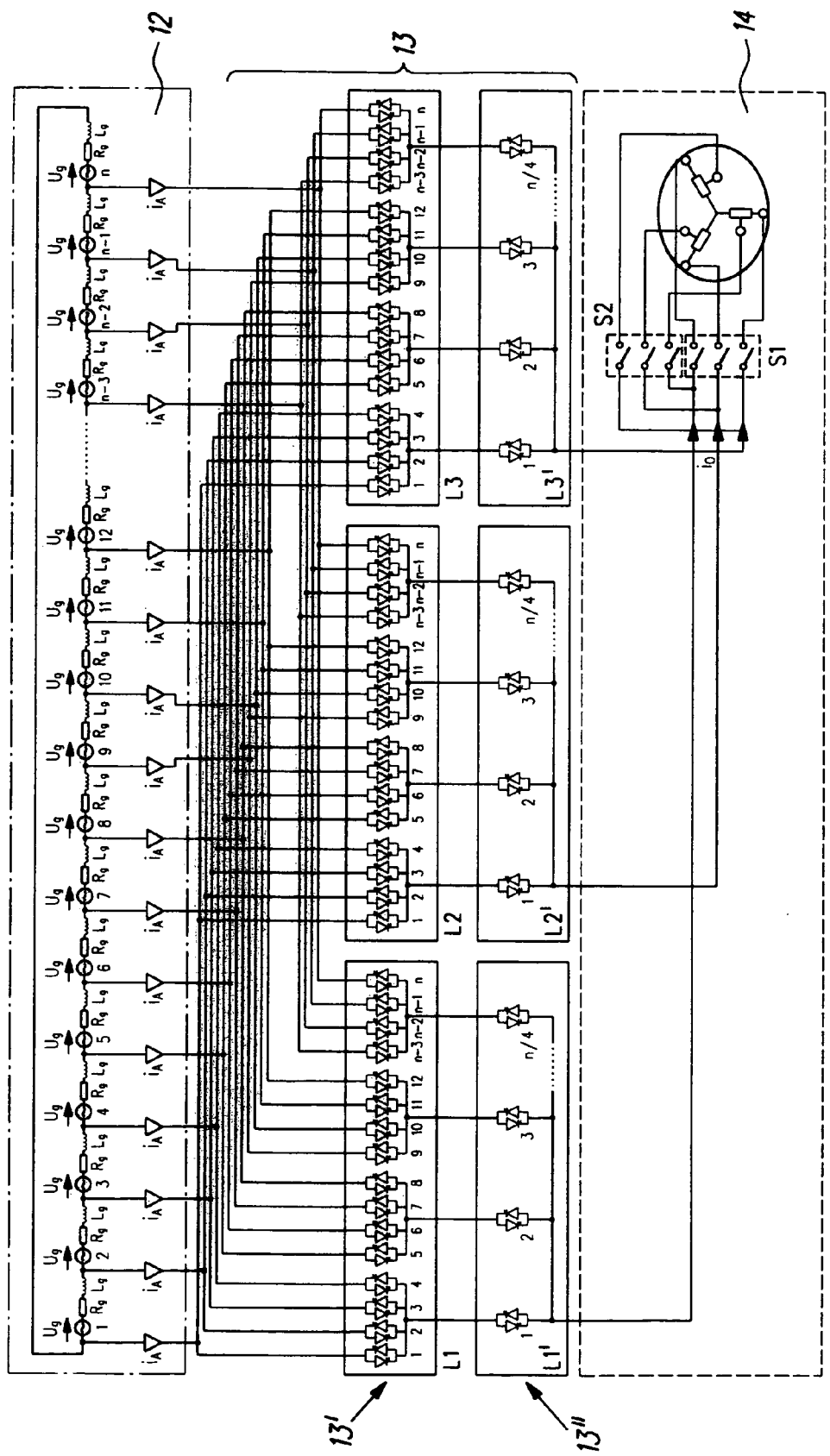
FIG. 2 shows an electrical wiring diagram of an example embodiment of an interconnection for a generator, a converter and a transformer for use in the system according to FIG. 1.

FIG. 2 shows further details of the generator 12, the converter 13, the transformer 14, as well as their electrical interconnections.

The generator 12 is a synchronous generator with a total number of n windings, in particular a synchronous generator with polygonal-shaped windings. As shown in FIG. 2, each of the n windings has a line resistance Rg and a winding inductance Lg. These line resistances Rg and the winding inductances Lg are numbered continuously from "1" to "n." While the generator 12 functions as generator, a voltage Ug is induced in each of the n windings, resulting in a current ig flowing to the converter 13.

The converter 13 is a matrix converter, which can also be considered a two-stage direct converter. Each of the n windings of the generator 12 is connected in a first stage 13' to three switching devices, respectively consisting of two thyristors, switched parallel and in opposite directions. The respectively three switching devices for the n windings are combined (as shown) into separate blocks L1, L2, L3 and are numbered continuously within the three blocks, respectively from "1" to "n."

For the present example embodiment, four switching devices are always interconnected on the output side within the three blocks L1, L2, L3 and are conducted to a second stage 13". In general, p switching devices can be interconnected on the output side and can be conducted to the second stage 13". In this second stage 13" the four and/or p interconnected switching devices are connected to additional switching devices, respectively consisting of two thyristors that are switched parallel and in opposite directions. The switching devices of the second stage 13" which are assigned to one of the blocks L1, L2, L3 in the first stage, are again combined into (as shown) respectively one block L1', L2', L3' and numbered continuously inside these blocks from "1" to "n/4" or "n/p."

The above described two-stage embodiment of the converter 13 is particularly advantageous for higher voltages, which require the series connection of thyristors. In those cases, the number of required thyristors can be reduced as a result of the two-stage design. Insofar as no series connection of thyristors is necessary, for example because of the voltage level, the second stage 13" can be bridged.

The four last-mentioned switching device combinations of the blocks L1', L2', L3' have a three-phase connection to the transformer 14. During the generator operation of the generator 12, a current i0 flows via this connection to the transformer 14.

The transformer 14 in particular is a block transformer, of which only the side facing the converter 13 is shown, which has three windings arranged in a star connection or Y connection. These windings assigned to the converter 13 can be interconnected in two different ways. On the one hand it is possible to connect the aforementioned three-phase connection coming from the converter 13 to the complete windings of the transformer 14. On the other hand, it is possible with the aid of intermediate taps at the windings to use only a portion of the windings and to connect the aforementioned three-phase connection only to this portion of the transformer 14 windings. Two three-phase switches S1 and S2 are used to switch between these options, which are inserted into the lines leading to the windings and the intermediate taps.

The switch S1 is closed during the generator operation of the generator 12, so that the complete windings of the transformer 14 are effective. If the turbine 11 rotation is started with the aid of fuels, as previously explained, then the electrical power generated by the generator 12 is supplied via the converter 13 and the transformer 14 to the load 15, in particular the electrical supply grid.

If the turbine 11 is a gas turbine or a technically similar turbine, for example, then this turbine 11 must be accelerated from the standstill to an operating speed in order to start the complete system 10. If a gas turbine is used, the turbine 11 must first be accelerated with an external drive, without internal drive, to approximately 70% to 90% of its required operating speed. The turbine 11 can only then be accelerated further to the full operating speed by feeding in fuel, meaning with an internal drive.

For the acceleration period where the turbine 11 must be operated by an external drive, the generator 12 of the aforementioned system 10 functions as a motor. The generator 12 is thus supplied with electrical power via the transformer 14 and the converter 13 in order to start its rotation. The power for this is drawn from the load 15, in particular the electrical power supply grid. Owing to the mechanical coupling, the rotation of the turbine 11 is also started and the turbine accelerated in this way, without requiring an internal drive for the turbine 11.

The aforementioned time interval for the acceleration, during which the turbine 11 is driven by the generator 12 functioning as a motor, is divided into three partial time intervals. During a first time interval T1, the turbine 11 is accelerated from the standstill to approximately 30% to 50% of its operating speed, in particular to 40% of its operating speed. The first time interval T1 therefore concerns low speeds of the turbine 11. The switching devices of the converter 13 are then shut down completely during a second time interval T2. During a following third time interval T3, the turbine 11 is accelerated from about 30% to 50% to about 70% to 90% and in particular to about 80% of its operating speed. The third period T3 therefore relates to high speeds for the turbine 11.

During the first time interval T1, a number of the generator 12 windings are combined, thereby creating an m-phase generator, wherein the number m of the combined windings is less than the total number n of the windings. The windings in this case are combined essentially symmetrical inside the generator 12.

Figure 3:
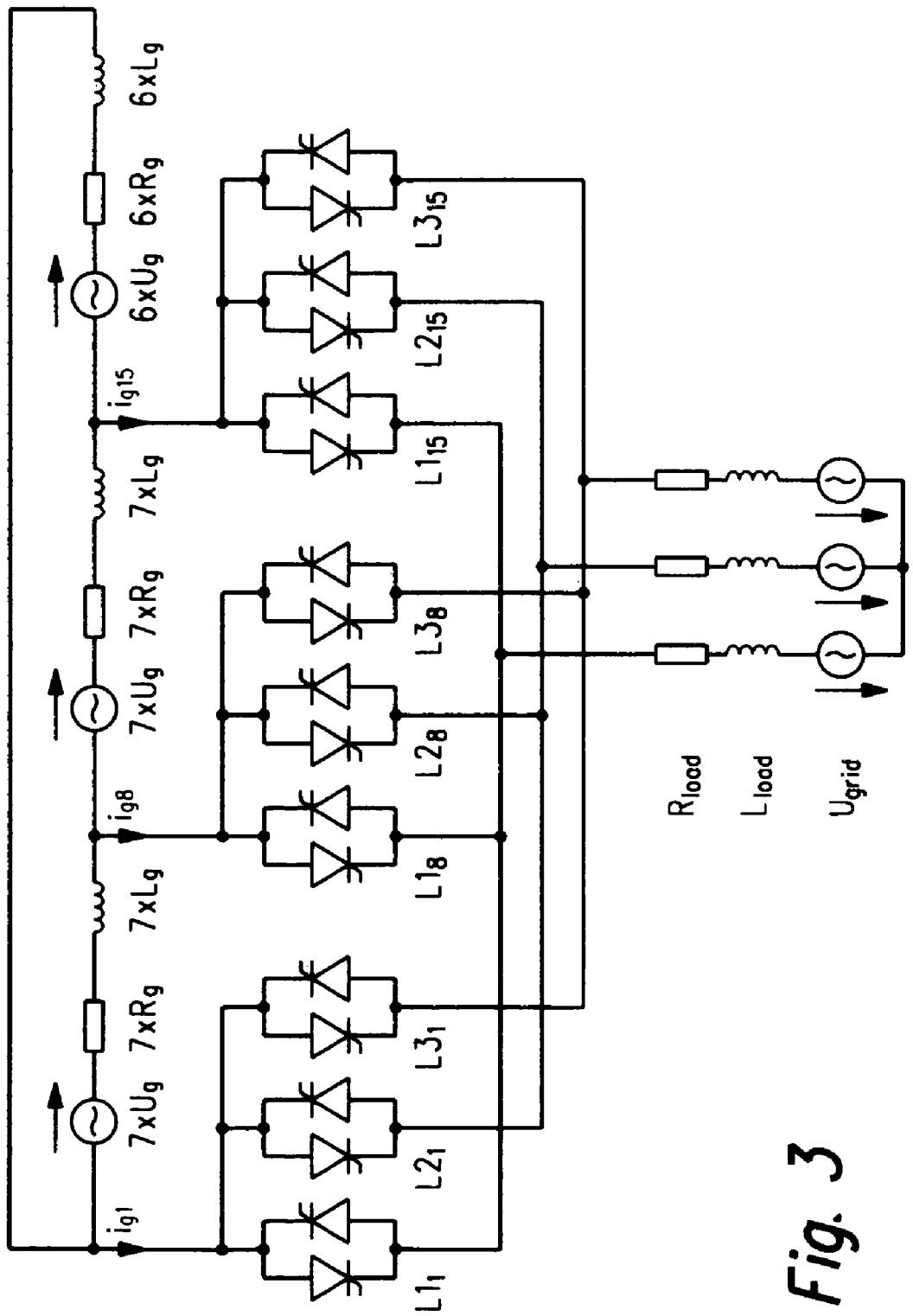
FIG. 3 shows an electrical wiring diagram for an example embodiment of the converter according to FIG. 2.

FIG. 3 shows an example embodiment of a 20-phase generator, having n=20 windings. With this generator, the windings are combined in such a way that a 3-phase generator is created, meaning m=3. According to FIG. 3, this is achieved by respectively combining the windings with numbers 1 to 7, as well as the windings with numbers 8 to 15 and the windings with numbers 16 to 20. FIG. 3 furthermore shows that the windings with numbers 1 to 7 when combined have 7 times the line resistance Rg, seven times the winding inductance Lg and seven times the induced voltage Ug. The same is also true for the windings with numbers 8 to 15, while the windings with numbers 16 to 20 respectively have six times the value. An essentially symmetrical distribution of the combined windings therefore results across the 20-phase generator.

The above-explained combining of windings is realized by activating only the switching devices shown in FIG. 3, meaning these are switched to the conducting state, while all other switching devices remain in the blocked state. The switching devices shown in FIG. 3 are switching devices that are respectively shown for the indicated block L1, L2, L3 in FIG. 2 and have been given therein the number indicated in FIG. 3. For example, the switching device L38 in FIG. 3 is the switching device with number 8 in the block L3 shown in FIG. 2.

If the generator 12 functions as a motor, as mentioned before, the electrical power is drawn from the electrical power grid, which is represented in FIG. 3 as the grid voltage Ugrid, the line resistances Rload, and the line inductances Lload. The transformer 14 is not shown in FIG. 3, but is contained in the aforementioned line resistances and the line inductances.

While the generator 12 is at a standstill, the electrical power is supplied by the energy supply grid via the switching devices shown in FIG. 3 to the generator windings combined as explained in the above, thus starting the first time interval Ti for the generator 12 operation.

During the standstill, the generator 12 voltage is equal to zero. A generator-dependent commutating of the switching devices of the converter 13 is not possible during this period, consequently requiring a grid-dependent commutating of the non-blocked switching devices.

At the start of the first time interval T1, following the start-up from the standstill, the voltage at the individual generator 12 windings as well as their frequency are low. By combining the windings, a higher voltage can be generated in the generator 12. It is advantageous in that case if the switch S3 at the transformer 14 is closed, so that the grid voltage Ugrid is present only in part at the converter 13. On the whole, it is thus possible to start the generator 12 rotation from the standstill.

The grid-dependent commutation is maintained during the complete time interval T1. A control of the currents flowing over the generator 12 can also be provided, thereby increasing the rotational speed of the generator 12 and also the rotational speed of the turbine 11.

The magnetic flux inside the generator 12 is maintained approximately constant, at a standard level during the first time interval T1. The voltage at the generator 12 consequently increases approximately proportional to its rotational speed and could thus increase to excessive values. For that reason, the magnetic flux is reduced above a level of approximately 12.5% of the operating speed for the generator 12 by reducing the excitation of the generator 12 above the aforementioned 12.5%, approximately proportional to the speed increase. As a result, the voltage at the generator 12 remains approximately constant above the aforementioned 12.5%.

Once the turbine in particular reaches approximately 40% of its operating speed, the switching devices of the converter 13 are briefly shut down completely during the time interval T2, in particular for approximately 3 to 5 seconds.

The converter 13 is operated normally during the following, third time interval T3. The generator windings are therefore no longer combined during the third time interval T3, as explained in connection with the first time interval T1. The wiring diagram shown in FIG. 2 therefore applies to the third time interval T3. The switch S2 at the transformer 14 remains closed, so that the grid voltage Ugrid continues to be present only in part at the converter 13.

No grid-dependent commutating furthermore takes place during this third period T3, as during the first time interval T1, but a generator-dependent commutating of the switching devices of the converter 13. The stator currents of the generator 12 are controlled such that active power flows from the energy supply grid to the generator 12. The magnetic flux in the generator 12 is adjusted to a specified value, for example to a value that is only slightly above the standard value by correspondingly controlling or regulating the generator 12 excitation.

The generator 12 and thus also the turbine 11 are accelerated in this way.

Once the turbine 11 reaches in particular 80% of its operating speed, the generator 12 stops functioning as a motor, the switching devices of the converter 13 are shut down, and the magnetic flux is reduced to approximately the standard value. Both switches S1 and S2 at the transformer 14 are also opened.

Fuel is then supplied to the turbine 11, so that the turbine 11 is accelerated with the aid of its internal drive to 100% of its operating speed.

As soon as the turbine 11 has reached its operating speed, the generator 12 functions as a generator and electrical power is then supplied to the load, in a manner as explained before, in particular to the energy supply grid.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operating a system for generating electrical power, the system including a turbine that is mechanically connected to a generator, the generator being electrically connected via a converter to a an electrical power supply grid, and the generator including a total number of windings, the method comprising: operating the generator as a generator at operating speed of the turbine for generating electrical power; and operating the generator as a motor at low rotational speed of the turbine for starting up the turbine, in so doing combining a number of the generator windings, wherein the number of combined generator windings is lower than the total number of windings of the generator, and wherein with an increasing rotational speed of the turbine, the magnetic flux of the generator is first kept constant and is then reduced.

2. The method according to claim 1, wherein the number of windings are combined at rotational speeds of the turbine that correspond approximately to 30% to 50% of the operating speed for the turbine.

3. The method according to claim 1, wherein the number of windings are combined during a first time interval.

4. The method according to claim 1, wherein the number of windings are combined starting with the standstill of the turbine.

5. The method according to claim 1, wherein the generator includes polygonal-shaped windings and wherein the windings are combined in an essentially symmetrical arrangement within the generator.

6. The method according to claim 1, wherein the converter includes a plurality of switching devices, in particular thyristors, and wherein the generator windings are combined by blocking corresponding switching devices.

7. The method according to claim 6, wherein the non-blocked switching devices are commutated in dependence on the load.

8. A method for operating a system for generating electrical power, the system including a turbine that is mechanically connected to a generator, the generator being electrically connected via a converter to a an electrical power supply grid, and the generator including a total number of windings, the method comprising: operating the generator as a generator at operating speed of the turbine for generating electrical power; and operating the generator as a motor at low rotational speed of the turbine for starting up the turbine, in so doing combining a number of the generator windings, wherein the number of combined generator windings is lower than the total number of windings of the generator, and, wherein for the start-up of the system, the converter is commutated at higher rotational speeds of the turbine in dependence on the generator.

9. A system for generating electrical power, comprising: a turbine, mechanically connected to a generator, the generator being electrically connected via a converter to an electrical power supply grid, the generator including a total number of windings, wherein the generator operates as a generator at operating speed of the turbine for generating electrical power, and the generator also operates as a motor at low rotational speed of the turbine for starting up the turbine, in so doing combining a number of the generator windings, and, wherein the combined number of generator windings is lower than the total number of windings of the generator, and, wherein with an increasing rotational speed of the turbine, the magnetic flux of the generator is first kept constant and is then reduced.

10. The system according to claim 9, wherein the generator is embodied as synchronous generator.

11. The system according to claim 9, wherein the converter is embodied as a matrix converter.

12. The system according to claim 9, wherein a transformer is provided, for which the windings have intermediate taps, and wherein a switch is assigned to the transformer, by which the converter is connectable to the intermediate taps.

13. The method according to claim 2, wherein the number of windings are combined at rotational speeds of the turbine that correspond approximately to approximately 40% of the operating speed.

14. The method according to claim 2, wherein the number of windings are combined during a first time interval.

15. The method according to claim 2, wherein the number of windings are combined starting with the standstill of the turbine.

16. The method according to claim 6, wherein the switching devices are thyristors, and wherein the generator windings are combined by blocking corresponding thyristors.

17. The method according to claim 7, wherein the load is an energy supply grid and wherein the non-blocked switching devices are commutated in dependence on the energy supply grid.

18. The system according to claim 10, wherein the generator is embodied as synchronous generator with polygonal-shaped windings.

19. The system according to claim 10, wherein the converter is embodied as a matrix converter.

20. A system for generating electrical power, comprising: a turbine, mechanically connected to a generator, the generator being electrically connected via a converter to an electrical power supply grid, the generator including a total number of windings, wherein the generator operates as a generator at operating speed of the turbine for generating electrical power, and the generator also operates as a motor at low rotational speed of the turbine for starting up the turbine, in so doing combining a number of the generator windings, and, wherein the combined number of generator windings is lower than the total number of windings of the generator, and, wherein for the start-up of the system, the converter is commutated at higher rotational speeds of the turbine in dependence on the generator.

* * * * *